United States Patent
Matsuda (10) Patent No.: US 12,153,836 B2
(45) Date of Patent: Nov. 26, 2024

(54) CONTROL DEVICE, NON-TRANSITORY COMPUTER-READABLE RECORDING MEDIUM STORING COMPUTER-READABLE INSTRUCTIONS FOR CONTROL DEVICE, AND CONTROL METHOD FOR CONTROL DEVICE

(71) Applicant: BROTHER KOGYO KABUSHIKI KAISHA, Nagoya (JP)

(72) Inventor: Munehisa Matsuda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/212,814

(22) Filed: Jun. 22, 2023

(65) Prior Publication Data

US 2023/0418528 A1    Dec. 28, 2023

(30) Foreign Application Priority Data

Jun. 22, 2022   (JP) .................................. 2022-100642

(51) Int. Cl.
G06F 3/12       (2006.01)
(52) U.S. Cl.
CPC .......... *G06F 3/1204* (2013.01); *G06F 3/1222* (2013.01); *G06F 3/1238* (2013.01)
(58) Field of Classification Search
None
See application file for complete search history.

(56) References Cited

U.S. PATENT DOCUMENTS

| | | | |
|---|---|---|---|
| 11,567,706 B1* | 1/2023 | Mayer | G06F 3/1229 |
| 2006/0259960 A1 | 11/2006 | Kondo | |
| 2012/0224207 A1* | 9/2012 | Sueshige | G06F 3/1288 |
| | | | 358/1.13 |
| 2016/0261636 A1 | 9/2016 | Saitoh | |
| 2019/0361640 A1* | 11/2019 | Miyake | G06F 3/129 |
| 2023/0082502 A1* | 3/2023 | Kaneda | B41J 29/38 |
| | | | 358/1.15 |

(Continued)

FOREIGN PATENT DOCUMENTS

| JP | 2006318304 A | 11/2006 |
|---|---|---|
| JP | 2010009289 A | 1/2010 |

(Continued)

*Primary Examiner* — Helen Zong
(74) *Attorney, Agent, or Firm* — Scully, Scott, Murphy & Presser, P.C.

(57) ABSTRACT

A control device may include a controller which: obtain second policy information from a memory which stores first policy information and the second policy information, wherein the first policy information corresponds to a specific setting item, and the second policy information corresponds to the specific setting item and is newer than the first policy information; determine whether an image processing device has used a specific set value which is set for the specific setting item; and in a case where it is determined that the image processing device has not used the specific set value, change the specific set value from a current set value to a new set value which conforms to the second policy information, wherein in a case where it is determined that the image processing device has used the specific set value, the specific set value is maintained at the current set value.

13 Claims, 6 Drawing Sheets

(56) References Cited

U.S. PATENT DOCUMENTS

| | | | |
|---|---|---|---|
| 2023/0161528 A1* | 5/2023 | Kim | G06F 3/1254 358/1.15 |
| 2023/0244358 A1* | 8/2023 | Suzuki | H04N 1/00517 715/810 |

FOREIGN PATENT DOCUMENTS

| | | | |
|---|---|---|---|
| JP | 2015099579 A | 5/2015 | |
| JP | 2019207481 A | 12/2019 | |

* cited by examiner

FIG. 1

(Communication System 2)

Policy Information

| Model Name | Item | Version | Default Value | Changing Rule | Force Flag |
|---|---|---|---|---|---|
| MD1 | PASSWORD | 1 | DS1 | SR1 | OFF |
| MD1 | PASSWORD | 2 | DS2 | SR2 | OFF |
| MD1 | PORT | 1 | DP1 | PR1 | OFF |
| MD1 | MAIL | 1 | DM1 | MR1 | OFF |
| MD1 | MAIL | 2 | DM2 | MR2 | ON |
| MD1 | LDAP | 1 | DA1 | AR1 | OFF |
| MD2 | PASSWORD | 1 | DS11 | SR11 | OFF |
| ... | ... | ... | ... | ... | ... |

CONTROL DEVICE, NON-TRANSITORY COMPUTER-READABLE RECORDING MEDIUM STORING COMPUTER-READABLE INSTRUCTIONS FOR CONTROL DEVICE, AND CONTROL METHOD FOR CONTROL DEVICE

REFERENCE TO RELATED APPLICATION

This application claims priority from Japanese Patent Application No. 2022-100642 filed on Jun. 22, 2022. The entire content of the priority application is incorporated herein by reference.

BACKGROUND ART

A server configured to send a SET request to a printer when policy information corresponding to a specific setting item of the printer is changed. The SET request is a request to change a current set value set for the specific setting item to a new set value which conforms to the changed policy information.

DESCRIPTION

In the above-described technique, a set value of the printer is also changed as the policy information is changed. The present teachings provide a technique configured to appropriately determine whether a set value is to be changed or not.

A control device disclosed herein may comprise a controller configured to: obtain second policy information from a memory which stores first policy information and the second policy information, wherein the first policy information corresponds to a specific setting item, the specific setting item being of an image processing device and being settable by a user, and the second policy information corresponds to the specific setting item and is newer than the first policy information; in a case where the second policy information is obtained from the memory, determine whether the image processing device has used a specific set value which is set for the specific setting item; and in a case where it is determined that the image processing device has not used the specific set value, change the specific set value from a current set value to a new set value which conforms to the second policy information, wherein in a case where it is determined that the image processing device has used the specific set value, the specific set value is maintained at the current set value.

The fact that the image processing device has used the specific set value is more likely to mean that the current set value is a set value set by the user, that is, a set value on which user's intention is reflected, than when the image processing device has not used the specific set value. Contrary to this, the fact that the image processing device has not used the specific set value is more likely to mean that the current set value is a set value unrelated to the user's intention than when the image processing device has used the specific set value. According to the above configuration, it is possible to appropriately determine whether or not a set value is to be changed by estimating user's intention about a specific set value.

A control method for realizing the above-mentioned control device, a program for the control device and a non-transitory computer-readable recording medium storing computer-readable instructions for the control device are also novel and useful.

Figure 1:
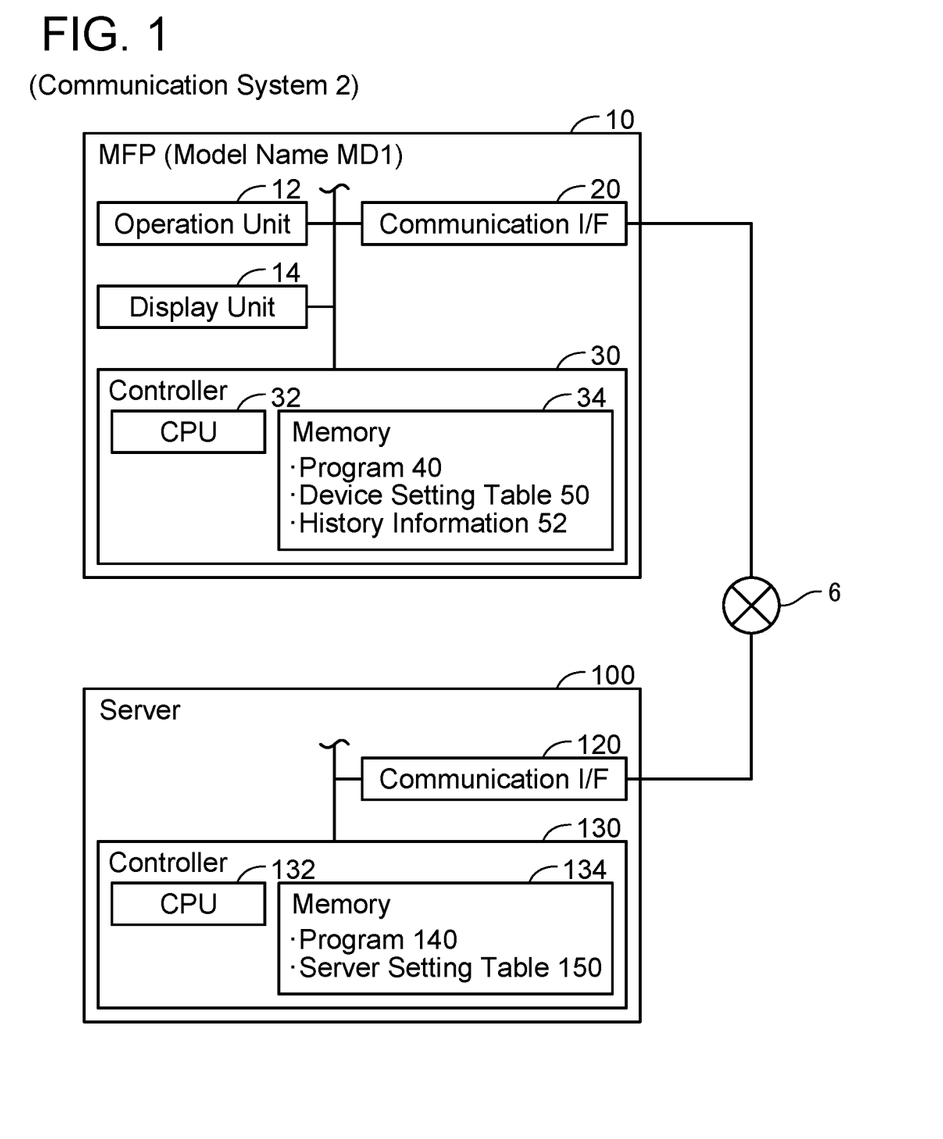
FIG. 1 is a configuration of a communication system.

FIRST EMBODIMENT (Configuration of Communication System 2; FIG. 1)

A communication device 2 comprises a multi-function peripheral (hereinafter, referred to as "MFP") 10 and a server 100. The MFP 10 is a device having multiple functions such as a print function, a scanning function, and a facsimile function. The MFP 10 further has a communication function of performing communication with external device(s). The communication function includes, for example, a web server function, a function of sending and receiving an e-mail, and a function of using a cloud server. The web server function is a function of transmitting web page data representing a web page to an external device in response to the external device (e.g., a PC) accessing a web server in the MFP 10. The MFP 10 and the server 100 are connected to the internet 6.

Figure 2:
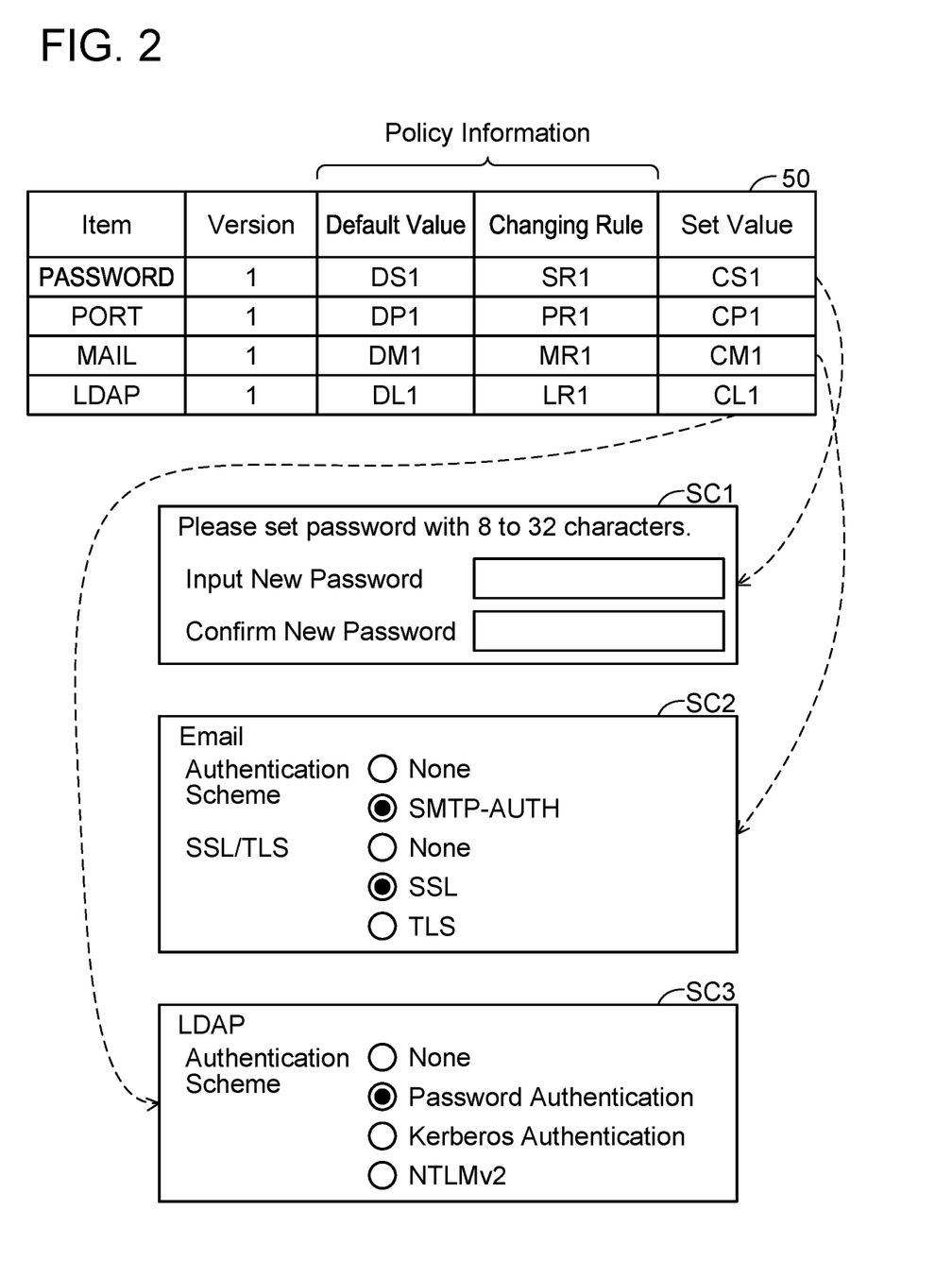
FIG. 2 is a device setting table and changing screens.

(Configuration of MFP 10; FIGS. 1 and 2)

A model of the MFP 10 indicates a model name MD1. The MFP 10 includes an operation unit 12, a display unit 14, a communication interface 20, and a controller 30. Hereinafter, an "interface" will be referred to as "I/F".

The operation unit 12 comprises one or more buttons. The operation unit 12 can receive various instructions from the user. The display unit 14 is a display configured to display various types of information. The display unit 14 also functions as a touch screen (that is, an operating unit) configured to accept an instruction from the user. The communication OF 20 is an OF configured to communicate via the Internet 6, and is connected to the Internet 6.

The controller 30 comprises a CPU 32 and a memory 34. The CPU 32 is configured to perform various processes according to a program 40 stored in the memory 34. The memory 34 is constituted of a volatile memory, a non-volatile memory, and/or the like.

The memory 34 further stores a device setting table 50 and history information 52. The device setting table 50 stores information about setting of a firmware of the MFP 10. As illustrated in FIG. 2, the device setting table 50 stores, for each of plural settings, a setting item indicating an item for the setting, a version of policy information of the setting, the policy information of the setting, and a current set value of the setting. The policy information is information indicating policy of a setting, and includes a default value and a changing rule.

The setting item "PASSWORD" indicates a password for logging into the web server function of the MFP 10. For example, a default value DS1 and a changing rule SR1 in the setting item "PASSWORD" are values determined in version "1" of the setting item "PASSWORD". The default value DS1 and the changing rule SR1 are predetermined, for example, by a vendor of the MFP 10.

The changing rule of the setting item "PASSWORD" includes a rule for a character string that can be used as a password. The rule of the character string is, for example, a minimum length, a maximum length of the character string, character type(s) (e.g., uppercase character, symbol) to be included in the character string, and prohibited character(s). Here, the changing rule of the setting item "PASSWORD" may not be limited to the above-described rule, and may include an example of a character string that is not recommended and an expiration date of a password, for example.

A set value CS1 indicates a value currently set for the setting item "PASSWORD" (i.e., character string of password). In version 1, the set value CS1 indicates the default value DS1 by default. On the other hand, the password can be changed by using, for example, a changing screen SC1 displayed on an external device by the web server function. If the password is changed, the set value CS1 indicates a value as changed.

A setting item "PORT" indicates a setting of a port used in a protocol of a transport layer. A default value DP1 and a changing rule PR1 of the setting item "PORT" are values determined in version "1" of the setting item "PORT". The setting of the port is a status of the port, a number of the port, for example. The status of the port is either "Closed" in which the use of the port is prohibited or "Open" in which the use of the port is permitted. For example, in version "1", the default value DP1 indicates "Open". The changing rule PR1 indicates, for example, whether or not to allow change in the status of the port.

A setting item "MAIL" indicates a setting of e-mail. The setting of e-mail is, for example, an authentication scheme of an e-mail server, an encryption scheme of e-mail. A default value DM1 and a changing rule MR1 of the setting item "MAIL" are values determined in version "1" of the setting item "MAIL". For example, the default value DM1 indicates use of authentication scheme "SMTP-AUTH" ("SMTP" is an abbreviation for Simple Mail Transfer Protocol) and use of encryption scheme "Secure Sockets Layer (SSL)". The changing rule MR1 indicates rules such as, for example, whether to allow change to another authentication scheme, whether to allow change to another encryption scheme (e.g., Transport Layer Security (TLS)), whether to allow setting that does not require authentication by the email server, and whether to allow a setting that does not require encryption of e-mail. The authentication scheme of the email server and the encryption scheme of e-mail can be changed by using, for example, a changing screen SC2.

A setting item "LDAP (Lightweight Directory Access Protocol)" indicates a setting of directory of the MFP 10. The setting of the directory is, for example, an authentication scheme of accessing the directory. A default value DL1 and a changing rule LR1 of the setting item "LDAP" are values determined in version "1" of the setting item "LDAP". For example, the default value DL1 indicates use of password authentication as an authentication scheme. The changing rule LR1 indicates rules such as, for example, whether to allow change to another authentication scheme (e.g., Kerberos authentication, NTLMv2) and whether to allow a setting that does not require authentication for accessing the directory. The authentication scheme of accessing the directory can be changed by using, for example, a changing screen SC3.

The plurality of settings illustrated in FIG. 2 are merely exemplary, and may include, for example, setting(s) of an authentication server (not illustrated) connected to the MFP 10.

The history information 52 includes usage history information and display history information. The usage history information includes, for each of plurality of functions of the MFP 10, a history of whether or not the user of the MFP 10 has ever used the function. For example, a plurality of setting items of the web server function includes the setting item "PASSWORD" and the setting item "LDAP". Since the usage history information includes a history indicating that the user used the web server function, it can be estimated that the MFP 10 used a set value corresponding to the setting item "PASSWORD" and a set value corresponding to the setting item "LDAP". Here, "the MFP 10 uses a set value" means that the MFP 10 has a history of executing a process using the set value (e.g., an internal process or communication with external device(s)).

The display history information includes histories of whether each of the changing screens SC1 to SC3 of FIG. 2 has been displayed or not. For example, it is possible to estimate that the MFP 10 has used the setting item "PASSWORD" because the display history information includes a history that the changing screen SC1 was displayed.

Figure 3:
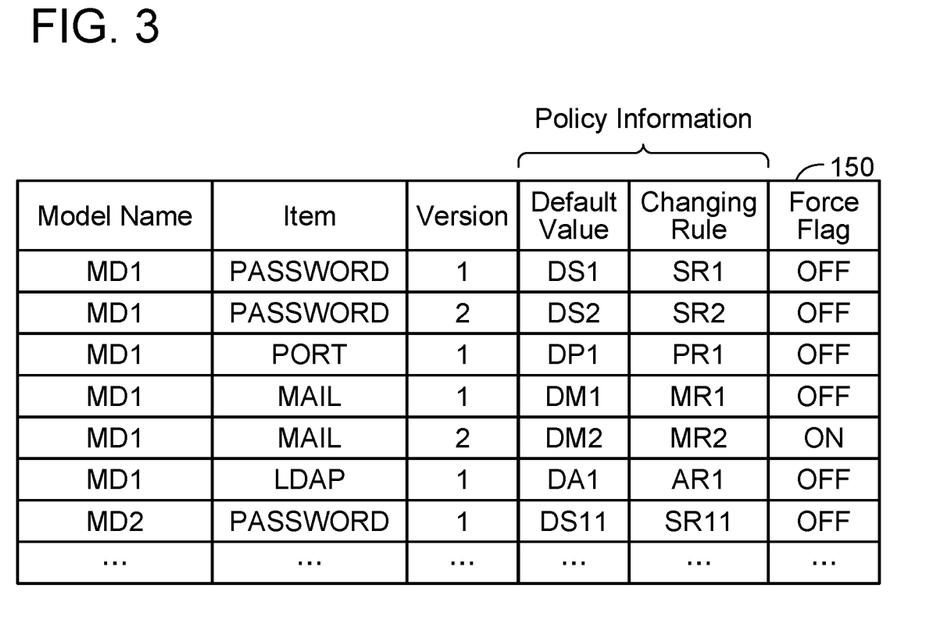
FIG. 3 is a server setting table.

(Configuration of Server 100; FIGS. 1 and 3)

The server 100 provides new policy information to the MFP 10. The server 100 is installed on the Internet 6 by a vendor of the MFP 10, for example. The server 100 comprises a communication OF 120 and a controller 130. The communication OF 120 is connected to the Internet 6. The controller 130 comprises a CPU 132 and a memory 134. The CPU 132 executes various processes according to a program 140 stored in the memory 134.

The memory 134 further stores a server setting table 150. The server setting table 150 stores, for each of plural types of models, a model name of the model, a setting item of a firmware of the model, a version of policy information of the model, and the policy information of the model. Further, the server setting table 150 stores, for each of the setting items, a force flag corresponding to the setting item. The force flag indicates one of a value "ON" indicating that the current set value of an MFP of the corresponding model is to be forcibly changed and a value "OFF" indicating that the current set value of the MFP of the corresponding model is not to be forcibly changed. The force flag is determined, for example, by the vendor of the MFP 10.

For example, it is assumed that the vendor of the MFP 10 wishes to change a policy of the setting item "PASSWORD". The vendor then uploads the policy information of version "2" (i.e., default value DS2 and changing rule SR2) to the server 100. As such, the new policy information of version "2" is stored in the server setting table 150.

Figure 4:
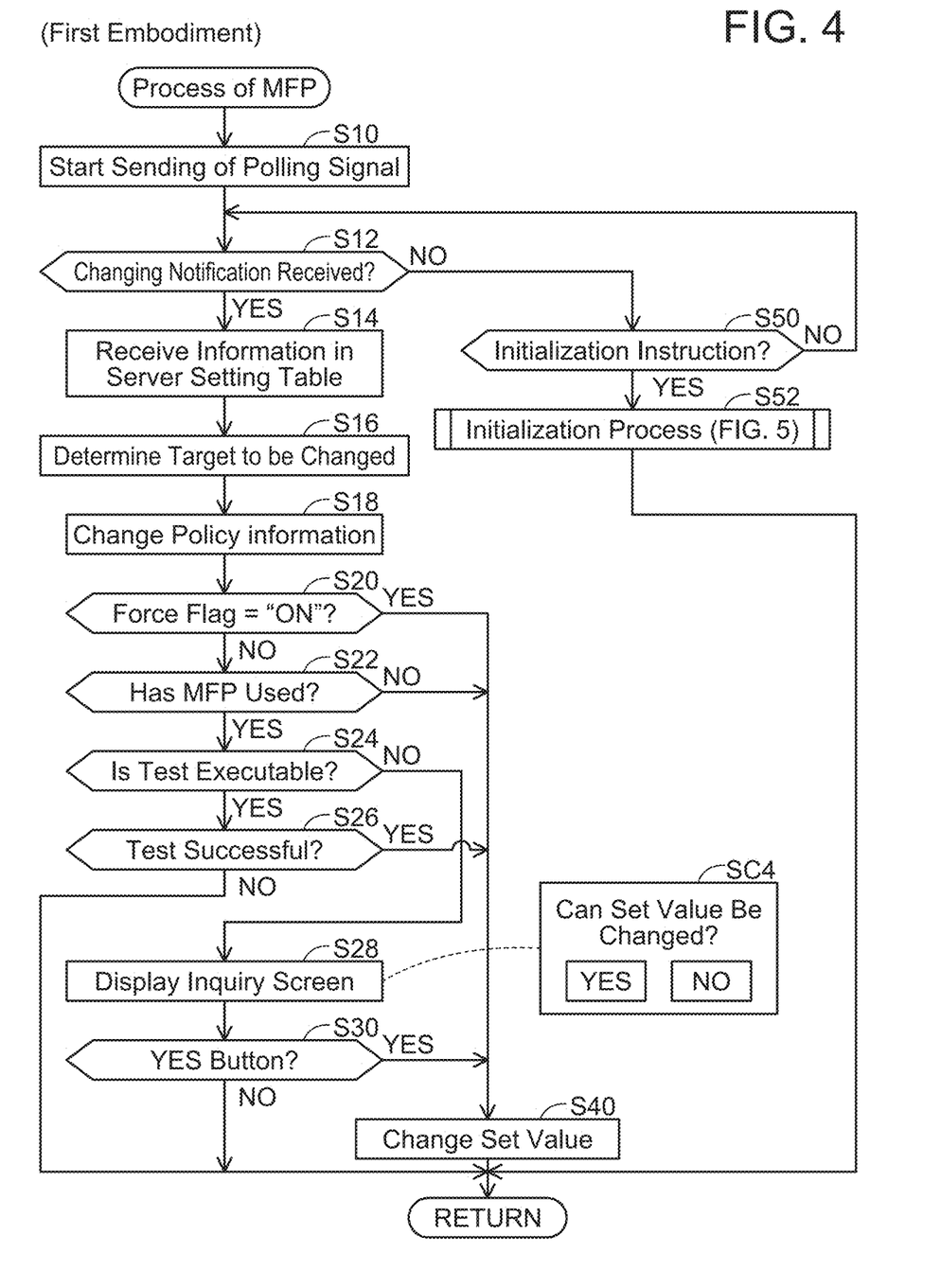
FIG. 4 is a flow chart diagram of process of an MFP.

(Processes of MFP 10; FIG. 4)

Referring to FIG. 4, processes performed by the CPU 32 of the MFP 10 in accordance with the program 40 will be described. A process of FIG. 4 is started with power of the MFP 10 being turned on as a trigger. Hereinafter, the MFP 10 communicates with the server 100 via the communication OF 20 and the Internet 6. Hereinafter, unless otherwise stated, descriptions "via the communication OF 20" and "via the internet 6" will be omitted.

In S10, the CPU 32 initiates periodic transmission of a polling signal to the server 100. The polling signal is a signal for confirming whether or not the new policy information has been stored in the server setting table 150. The polling signal includes the model name MD1 and the respective versions in the device setting table 50. When the polling signal is received from the MFP 10, the server 100 obtains a plurality of versions stored in association with the model name MD1 in the polling signal from the server setting table 150. The server 100 compares the obtained plurality of versions with the versions in the polling signal. The server 100 sends a change notification to the MFP 10 as a response to the polling signal when at least one version of the obtained plurality of versions is greater than the versions in the polling signal. Contrary to this, the server 100 does not send the change notification to the MFP 10 when all of the obtained versions are equal to or smaller than the versions in the polling signal. The change notification is a notification indicating that there are setting(s) to be changed to the new policy information.

Following S10, the CPU 32 performs S12 and S50 monitorings. In S12 monitoring, the CPU 32 monitors for receiving the change notification from the server 100. In S50, the CPU 32 monitors for the operation unit 12 receiving an initialization instruction. The initialization instruction is an instruction for executing an initialization process (see FIG. 5). The initialization process is a process of initializing the respective settings of the firmware of the MFP 10. When each setting is initialized, the set value of each setting is changed to its default value.

The CPU 32 proceeds to S14 when the change notification is received from the server 100 (YES in S12). In S14, the CPU 32 sends a request including the model name MD1 to the server 100, and receives all piece(s) of information (hereinafter, referred to as "information of the model name MD1") stored in association with the model name MD1 among the information in the server setting table 150 from the server 100.

In S16, the CPU 32 compares the versions in the device setting table 50 with the versions in the information of the model name MD1. The CPU 32 determines, as a target to be changed, a setting item (for example, the setting item "PASSWORD") corresponding to the version, of all the versions in the device setting table 50, which is smaller than the versions in the information of the model name MD1.

In S18, the CPU 32 deletes the policy information corresponding to the target to be changed from the device setting table 50 and stores the new policy information in the device setting table 50. For example, when the setting item "PASSWORD" is the target to be changed, the default value DS1 and the changing rule SR1 are deleted from the device setting table 50, and the new policy information (i.e., the default value DS2 and the changing rule SR2) obtained from the server 100 is stored in the device setting table 50. Due to this, the policy information of the setting item "PASSWORD" is upgraded from version "1" to version "2". Here, the version corresponding to the setting item "PASSWORD" in the device setting table 50 is also changed from "1" to "2".

In S20, the CPU 32 determines whether the force flag corresponding to the target to be changed in the information of the model name MD1 received from the server 100 indicates "ON" or not. When it is determined that the force flag indicates "ON" (YES in S20), the CPU 32 skips processes of S22 to S30 to be described later and proceeds to S40. In S40, the CPU 32 changes the set value corresponding to the target to be changed in the device setting table 50 to the default value of the new policy information. When S40 ends, the CPU 32 returns to S12 and S50 monitorings.

For example, there may be a case where, in regards to a specific setting of the firmware settings, security-related setting(s) such as authentication scheme and encryption scheme in particular, the vendor of the MFP 10 wishes to change the current set value(s) to more secure set value(s). According to the above configuration, the vendor can suppress the current set value(s) from being maintained contrary to the intention of the vendor by determining the force flag to be "ON".

Further, when it is determined that the force flag indicates "OFF" (NO in S20), the CPU 32 proceeds to S22. In S22, the CPU 32 determines whether the MFP 10 has used the set value corresponding to the target to be changed or not. Specifically, the CPU 32 executes a first estimation using the default value and a second estimation using the history information 52.

The first estimation comprises the CPU 32 determining whether the current set value corresponding to the target to be changed in the device setting table 50 is identical to the default value of the old policy information prior to being changed in S18. Since the current set value is identical to the default value, it can be estimated that the set value corresponding to the target to be changed has been maintained at the default value because, for example, the user does not know the function related to the target to be changed (e.g., a web server function related to the setting item "PASSWORD"). When it is determined in the first estimation that the current set value is identical to the default value, the CPU 32 estimates that the MFP 10 has not used the set value corresponding to the target to be changed. Contrary to this, when it is determined that the current set value differs from the default value, the CPU 32 estimates that the MFP 10 has used the set value corresponding to the target to be changed.

The second estimation comprises the CPU 32 determining whether the history information 52 includes an estimatable history based on which usage of the set value corresponding to the target to be changed can be estimated or not. When it is determined in the second estimation that the history information 52 does not include the estimatable history based on which the usage of the set value corresponding to the target to be changed can be estimated, the CPU 32 estimates that the MFP 10 has not used the set value corresponding to the target to be changed. Contrary to this, when it is determined that the history information 52 includes the estimatable history based on which the usage of the set value corresponding to the target to be changed can be estimated, the CPU 32 estimates that the MFP 10 has used the set value corresponding to the target to be changed.

In the present embodiment, when it is estimated in both the first and second estimations that the MFP 10 has used the set value corresponding to the target to be changed, the CPU 32 determines that the MFP 10 has used the set value corresponding to the target to be changed. Contrary to this, when it is estimated in at least one of the first estimation and the second estimation that the MFP 10 has not used the set value corresponding to the target to be changed, the CPU 32 determines that the MFP 10 has not used the set value corresponding to the target to be changed.

For example, a first situation may be assumed in which the set value corresponding to the target to be changed has been changed from the default value to another value, even though the user has not used the function related to the target to be changed. In a comparative example in which only the first estimation using the default value is executed in S22 determination, in the first situation, the set value is not changed from the other value to the default value which conforms to the new policy information. Also, for example, a second situation may be assumed in which the set value corresponding to the target to be changed has been maintained at the default value although the user has been using the function related to the target to be changed. In a comparative example in which only the second estimation using the history information 52 is executed in S22 determination, in the second situation, the set value is not changed from the default value which conforms to the old policy information to the default value which conforms to the new policy information. The configuration of the present embodiment that performs both the first estimation and the second estimation can handle the first situation and the second situation. In a modification, the comparative example in which only the first estimation is executed and the comparative example in which only the second estimation is executed may be implemented.

When it is determined that the MFP 10 has not used the set value corresponding to the target to be changed (NO in S22), the CPU 32 skips S24 and subsequent processes to be described later and proceeds to S40. Contrary to this, when it is determined that the MFP 10 has used the set value corresponding to the target to be changed (YES in S22), the CPU 32 proceeds to S24.

In S24, the CPU 32 determines whether the function related to the target to be changed is capable of testing. For example, functions related to the setting items "PORT", "MAIL", and "LDAP" (e.g., part of communication function) are capable of testing. For example, testing of the function related to the setting item "MAIL" is to attempt to communicate with an email server which uses a new encryption scheme which conforms to the new policy information. On the other hand, for example, the function related to the setting item "PASSWORD" (e.g., part of web server function) is incapable of testing. The above-described examples about capability and the above-described examples about incapability are merely examples.

When it is determined that the function related to the target to be changed is capable of testing (YES in S24), the CPU 32 performs a test of the function related to the target to be changed. Then, in S26, the CPU 32 determines whether the test of the function related to the target to be changed succeeds. When it is determined that the test of the function related to the target to be changed has succeeded (YES in S26), the CPU 32 proceeds to S40.

Further, when it is determined that the test of the function related to the target to be changed has failed (NO in S26), the CPU 32 proceeds to S28. According to such a configuration, it is possible to suppress the set value corresponding to the target to be changed in the device setting table 50 from being changed in a situation where the test using the set value which conforms to the new policy information fails (NO in S26 and NO in S30 to be described later).

In S28, the CPU 32 causes the display unit 14 to display an inquiry screen SC4 inquiring change of the set value corresponding to the target to be changed in the device setting table 50. The inquiry screen SC4 includes a "YES" button and a "NO" button.

In S30, the CPU 32 determines whether the "YES" button in the inquiry screen SC4 has been selected or not. When it is determined that the "YES" button in the inquiry screen SC4 has been selected (YES in S30), the CPU 32 proceeds to S40. According to such a configuration, it is possible to confirm the user's intention prior to changing the set value.

When it is determined that the "NO" button in the inquiry screen SC4 has been selected (NO in S30), the CPU 32 skips the process of S40 and returns to S12 and S50 monitorings.

When the operation unit 12 receives the initialization instruction (YES in S50), the CPU 32 executes the initialization process, which will be described later with reference to FIG. 5, in S52. When S52 ends, the CPU 32 returns to S12 and S50 monitorings.

(Initialization Process; FIG. 5)

In S100, the CPU 32 sends an inquiry signal inquiring an existence of the new policy information to the server 100. The inquiry signal includes the model name MD1 and the respective versions in the device setting table 50.

In S102, the CPU 32 determines whether a response to the inquiry signal indicates the existence of the new policy information. When it is determined that the response to the inquiry signal does not indicate the existence of the new policy information (NO in S102), the CPU 32 skips S104 and subsequent processes and proceeds to S120.

In S120, the CPU 32 changes the respective settings of the firmware to the respective default values currently stored in the device setting table 50. This completes the initialization of the firmware. When S120 ends, the CPU 32 ends the process of FIG. 5.

Also, when it is determined that the response to the inquiry signal indicates the existence of the new policy information (YES in S102), the CPU 32 proceeds to S104. In S104, the CPU 32 causes the display unit 14 to display an inquiry screen SC5 inquiring permission on the initialization according to the new policy information. The inquiry screen SC5 includes an "YES" button and a "NO" button.

In S106, the CPU 32 determines whether the "YES" button in the inquiry screen SC5 has been selected or not. When it is determined that the "YES" button in the inquiry screen SC5 has been selected (YES in S106), the CPU 32 proceeds to S108.

S108 to S112 are the same as S14 to S18 of FIG. 4. That is, in the device setting table the policy information corresponding to the target to be changed is changed from the old policy information to the new policy information. When S112 ends, the CPU 32 proceeds to S120.

When it is determined that the "NO" button in the inquiry screen SC5 has been selected (NO in S106), the CPU 32 skips processes of S108 to S112 and proceeds to S120.

According to the above configuration, when the new policy information exists at the timing when the operation unit 12 receives the initialization instruction (YES in S102), the initialization which conforms to the new policy information can be executed.

When the "YES" button in the inquiry screen SC5 is selected (YES in S106), the initialization which conforms to the new policy information is executed, whereas when the "NO" button in the inquiry screen SC5 is selected (NO in S106), the initialization which conforms to the old policy information is executed. The user can select which to perform, the initialization which conforms to the new policy information or the initialization which conforms to the old policy information.

Effect of Present Embodiment

The fact that the MFP 10 has used a specific set value (e.g., set value of setting item "PASSWORD") (YES in S22 of FIG. 4) is more likely to mean that the current set value is a set value set by the user, that is, set value on which the user's intention is reflected, than when the MFP 10 has not used the specific set value. According to the configuration of the present embodiment, it is possible to suppress the set value on which the user's intention is reflected from being changed contrary to the user's intention.

Also, the fact that the MFP 10 has not used a specific set value (NO in S22 of FIG. 4) is more likely to mean that the specific set value has not been changed from the default value even once than when the MFP 10 has used the specific set value. For example, when the user does not know a function (e.g., web server function) related to the specific set value, the specific set value might continue to be maintained at the default value without the user knowing (i.e., independent of the user's intention). For example, if the specific set value is a set value corresponding to the setting item "PASSWORD", the password has not been changed from the default value even once, and thus there is a possibility that the information in the MFP 10 might be illegally obtained by a third party. According to the configuration of the present embodiment, it is possible to change a specific set value unrelated to the user's intention, for example, a specific set value related to a function that the user does not know, to a set value which conforms to the new policy information.

In addition, the set value is a value on which the user's intention can be reflected, whereas the policy information is information determined by a person/party (for example, a vendor) who is not the user. In particular, the policy information continues to be updated for increased security. According to the configuration of the present embodiment, it is possible to change the policy information in the device setting table 50 to the new policy information (S18 in FIG. 4) regardless of the determination on whether the MFP 10 has used the specific set value or not (see S22). Alternatively, in a modification, the policy information in the MFP 10 may be changed to latest policy information when it is determined that the MFP 10 has used the set value (YES in S22).

(Correspondence Relationship)

The controller 30 and the MFP 10 are an example of "control device" and "image processing device", respectively. The history information 52 is an example of "usage history information" and "display history information". The set value(s) in the device setting table 50 are an example of "current set value". The policy information in the device setting table 50 is an example of "rule information". The server 100 and the memory 134 are an example of "server" and "memory", respectively. The policy information of version "1" in the server setting table 150 is an example of "first policy information", and the policy information of version "2" in the server setting table 150 is an example of "second policy information". The force flag "ON" is an example of "predetermined flag value". Any of the changing screens SC1 to SC3 of FIG. 2 is an example of "changing screen". The inquiry screen SC4 of FIG. 4 and the inquiry screen SC5 of FIG. 5 are an example of "first inquiry screen" and "second inquiry screen", respectively.

S14, S22, S40 of FIG. 4 are an example of processes implemented by "obtain second policy information from a memory which stores first policy information and the second policy information", "determine whether the image processing device has used a specific set value", and "change the specific set value from a current set value to a new set value which conforms to the second policy information", respectively.

Second Embodiment

In the present embodiment, determination on whether or not to change a set value is executed by the server 100. The configuration of the present embodiment is the same as that of the first embodiment except that process of FIG. 6 is executed instead of the processes of FIG. 3 and FIG. 4.

(Process of Server 100; FIG. 6)

Figure 6:
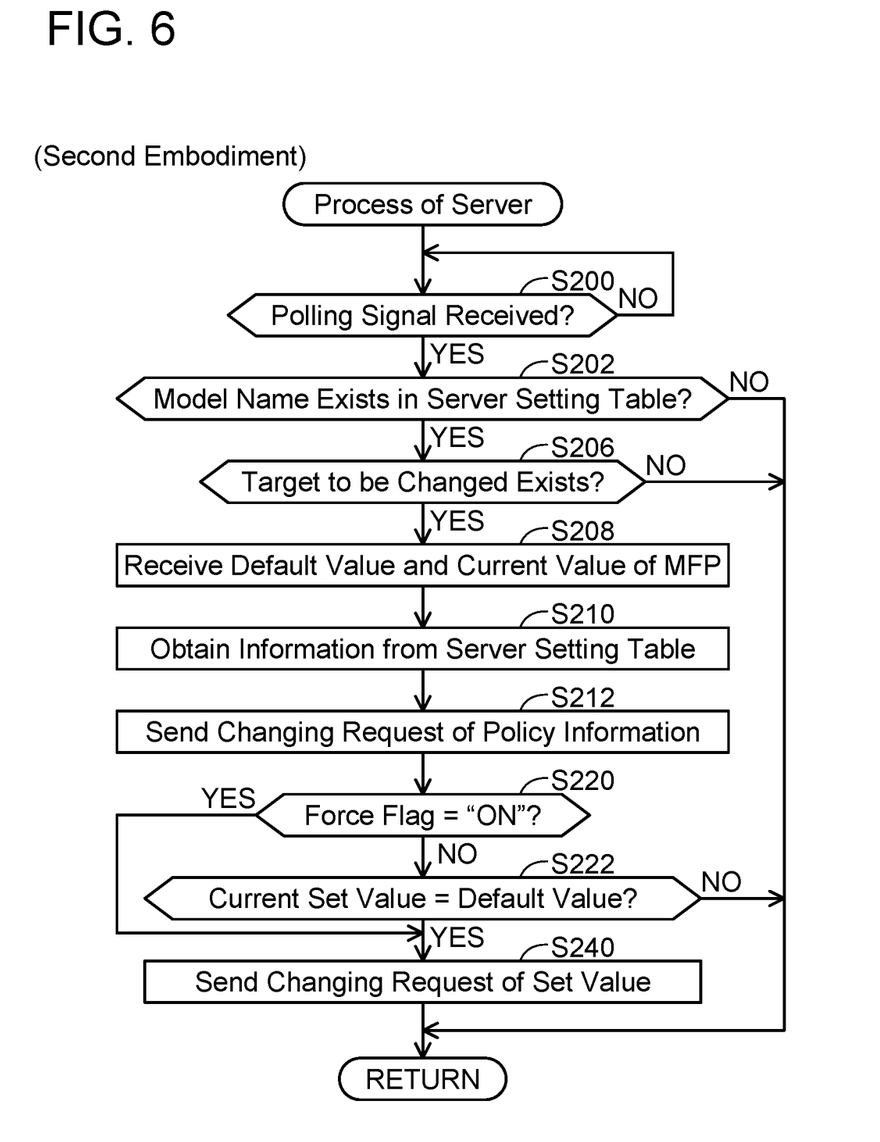
FIG. 6 is a flow chart diagram of process of a server.

With reference to FIG. 6, processes executed by the CPU 132 of the server 100 in accordance with the program 140 will be described. The process of FIG. 6 is started with the power of the server 100 being turned on as a trigger. Hereinafter, unless otherwise stated, descriptions "via the communication OF 120" and "via the internet 6" will be omitted.

In S200, the CPU 132 monitors for receiving a polling signal from the MFP 10. When the polling signal is received from the MFP 10 (YES in S200), the CPU 132 proceeds to S202.

In S202, the CPU 132 determines whether the model name included in the polling signal received in S200 is included in the server setting table 150. When it is determined that the model name included in the polling signal is not included in the server setting table 150 (NO in S202), the CPU 132 skips S204 and subsequent processes and returns to S200 monitoring.

When it is determined that the model name included in the polling signal is included in the server setting table 150 (YES in S202), the CPU 132 proceeds to S204. In S204, the CPU 132 compares the versions in the server setting table 150 that are stored in association with the model name in the polling signal with the versions in the polling signal. The CPU 132 determines whether there is a setting item (i.e., target to be changed) corresponding to a version greater than the versions in the polling signal in the server setting table 150. When it is determined that there is no target to be changed (NO in S206), the CPU 132 skips S208 and subsequent processes and returns to S200 monitoring. Contrary to this, when it is determined that there is the target to be changed (YES in S206), the CPU 132 proceeds to S208.

In S208, the CPU 132 receives, from the MFP 10, information of the device setting table 50 which corresponds to the target to be changed determined in S206 (i.e., receives the default value and the current set value).

In S210, the CPU 132 obtains information corresponding to the target to be changed from the server setting table 150 (i.e., obtains the policy information and force flag).

In S212, the CPU 132 sends a changing request to change the policy information to the MFP 10. The changing request is a request to change the policy information corresponding to the target to be changed in the device setting table 50 to the policy information obtained in S210. Due to this changing request, the policy information in the device setting table 50 is changed to the new policy information.

In S220, the CPU 132 determines whether the force flag obtained in S210 indicates "ON" or not. When it is determined that the force flag indicates "ON" (YES in S220), the CPU 132 skips a process of S222 to be described later and proceeds to S240. In S240, the CPU 132 sends a changing request to change a set value to the MFP 10. The changing request is a request to change the set value corresponding to the target to be changed in the device setting table 50 to the default value of the policy information obtained in S210. Due to this changing request, the set value in the device setting table 50 to the default value which conforms to the new policy information. When S240 ends, the CPU 132 returns to S200 monitoring.

Also, when it is determined that the force flag indicates "OFF" (NO in S220), in S222, the CPU 132 determines whether the current set value received from the MFP 10 in S208 is identical to the default value received from the MFP 10 in S208 or not. This determination is the same as the first estimation in S22 of the first embodiment. When it is determined that the current set value is identical to the default value (YES in S222), the CPU 132 proceeds to S240. Contrary to this, when it is determined that the current set value differs from the default value (NO in S222), the CPU 132 skips the process of S240 and returns to S200. That is, the set value of the MFP 10 is changed when it is estimated that the MFP 10 has not used the set value corresponding to the target to be changed due to the current set value being identical to the default value. Contrary to this, the set value of the MFP 10 is not changed when it is estimated that the MFP 10 has used the set value corresponding to the target to be changed due to the current set value differing from the default value.

In the present embodiment, the user's intention for a specific set value can be estimated by way of the determination of S222. In the present embodiment also, as in the first embodiment, it is possible to appropriately determine whether to change a set value by estimating user's intention for the specific set value.

(Correspondence Relationship)

The server 100 is an example of "control device". S210, S222, S240 of FIG. 6 are an example of processes implemented by "obtain second policy information from a memory which stores first policy information and the second policy information", "determine whether the image processing device has used a specific set value", and "change the specific set value from a current set value to a new set value which conforms to the second policy information", respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(Modification 1) In the second estimation using the history information 52, one of the usage history information and the display history information may be used, and the other may not be used. In the present modification, "usage history information" or "display history information" can be omitted. In S22 of FIG. 4, only the first estimation using a default value may be executed. In this modification, both "usage history information" and "display history information" can be omitted.

(Modification 2) The processes of S24 and S26 of FIG. 4 may not be executed. In this modification, "test the specific function" can be omitted.

(Modification 3) The inquiry screens SC4 and SC5 may not be limited to be displayed on the display unit 14 of the MFP 10, but may be displayed on a display unit of an external device configured to communicate with the MFP 10 (e.g., PC). In the present modification, the display unit of the external device is an example of "display unit".

(Modification 4) The processes of S28 and S30 of FIG. 4 may not be executed. In the present modification, the "first the inquiry screen" can be omitted.

(Modification 5) In S22 of FIG. 4, only the second estimation using the history information 52 may be executed. In this modification, the determination on "whether the current set value is identical to the default value of the specific set value" can be omitted.

(Modification 6) The server setting table 150 may not store the force flag. In the present modification, "predetermined flag value" can be omitted.

(Modification 7) The processes of S50 and S52 of FIG. 4 may not be executed. In this modification, "initialize the specific set value" can be omitted.

Figure 5:
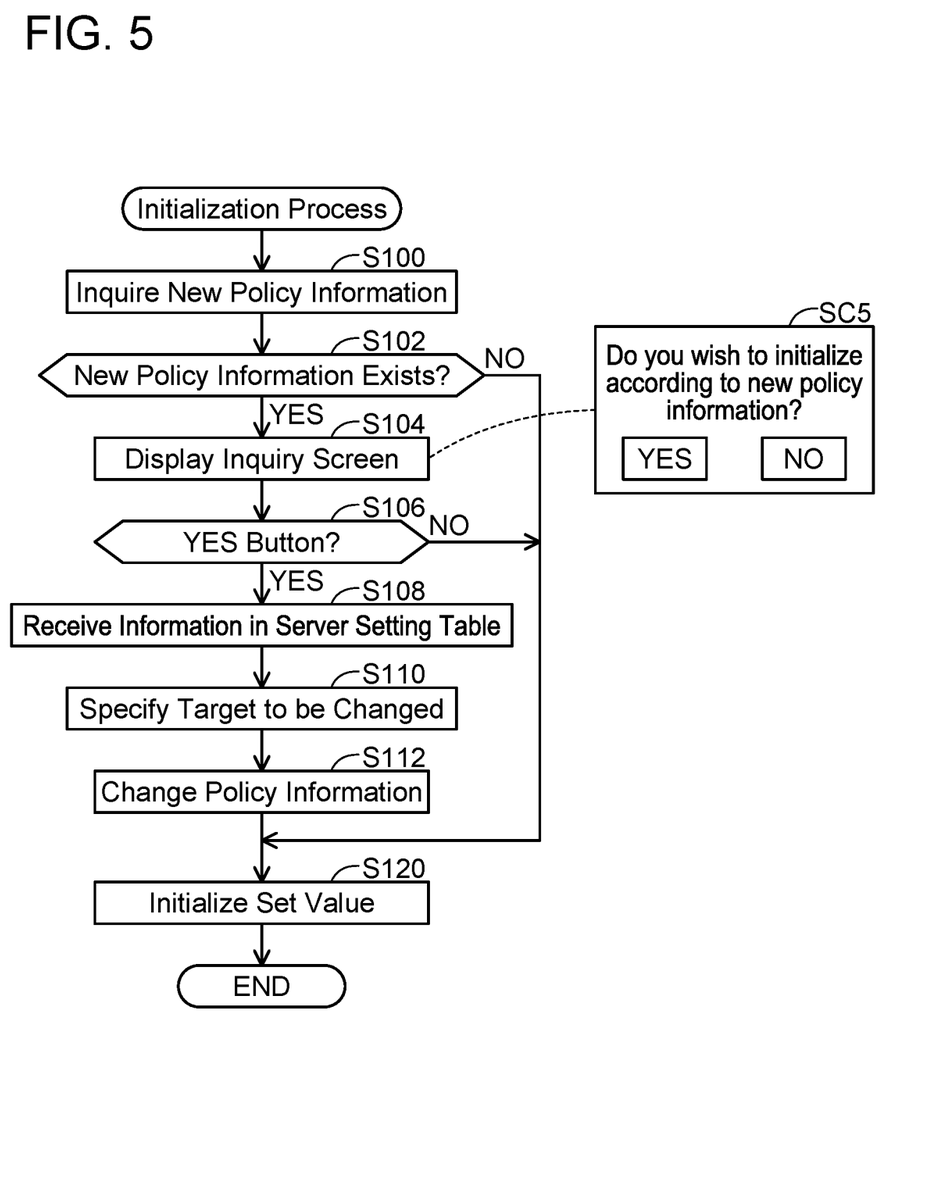
FIG. 5 is a flow chart diagram of an initialization process.

(Modification 8) The processes of S104 and S106 of FIG. 5 may not be executed. In the present modification, "second the inquiry screen" can be omitted.

(Modification 9) The process of S10 of FIG. 4 may not be executed. For example, the CPU 32 may monitor for receiving a push notification including the change notification from the server 100 in S12. In the present modification, "polling signal" can be omitted.

(Modification 10) The "image processing device" may not be the MFP 10, but may be, for example, a printer, a scanner, or a facsimile device.

(Modification 11) Although in each of the above-described embodiments the respective processes in FIGS. 4 to 6 are realized by software (for example, program 40 or 140), at least one of the respective processes may be realized by hardware such as a logic circuit.

What is claimed is:

1. A control device, comprising:
a memory; and
a controller configured to:
  obtain second policy information from the memory which stores first policy information and the second policy information, wherein the first policy information corresponds to a specific setting item, the specific setting item being of an image processing device and being settable by a user, and the second policy information corresponds to the specific setting item and is newer than the first policy information;
in a case where the second policy information is obtained from the memory, determine whether the image processing device has used a specific set value which is set for the specific setting item; and
in a case where it is determined that the image processing device has not used the specific set value, change the specific set value from a current set value to a new set value which conforms to the second policy information, wherein in a case where it is determined that the image processing device has used the specific set value, the specific set value is maintained at the current set value.

2. The control device according to claim 1, wherein
the image processing device has a specific function,
one or more setting items of the specific function include the specific setting item,
the controller determines that the image processing device has used the specific set value in a case where usage history information indicating a usage history of the specific function is stored in the image processing device, and
the controller determines that the image processing device has not used the specific set value in a case where the usage history information is not stored in the image processing device.

3. The control device according to claim 1, wherein
the image processing device is configured to display a changing screen for changing the specific set value,
the controller determines that the image processing device has used the specific set value in a case where display history information indicating a display history of the changing screen is stored in the image processing device, and
the controller determines that the image processing device has not used the specific set value in a case where the display history information is not stored in the image processing device.

4. The control device according to claim 1, wherein
the image processing device has a specific function,
one or more setting items of the specific function include the specific setting item,
the controller is further configured to:
in the case where it is determined that the image processing device has used the specific set value, test the specific function by using the new set value which conforms to the second policy information; and in a case where the test of the specific function succeeds, change the specific set value from the current set value to the new set value, wherein the specific set value is maintained at the current set value in a case where the test of the specific function fails.

5. The control device according to claim 1, wherein the controller is further configured to:

in the case where it is determined that the image processing device has used the specific set value, cause a display unit to display an inquiry screen for inquiring about changing the specific set value; and in a case where the specific set value is instructed to be changed in the inquiry screen, change the specific set value from the current set value to the new set value, wherein in a case where the specific set value is not instructed to be changed in the inquiry screen, the specific set value is maintained at the current set value.

6. The control device according to claim 1, wherein the controller determines that the image processing device has used the specific set value in a case where the current set value is different from a default value of the specific set value, and the controller determines that the image processing device has not used the specific set value in a case where the current set value is identical to the default value.

7. The control device according to claim 1, wherein the controller is further configured to change the specific set value from the current set value to the new set value without determining whether the image processing device has used the specific set value in a case where a predetermined flag value is stored in association with the second policy information in the memory.

8. The control device according to claim 1, wherein the image processing device stores the current set value which is set for the specific setting item and rule information indicating a rule related to the specific setting item, and the controller is further configured to change the rule information stored in the image processing device to another rule information which conforms to the second policy information regardless of whether the image processing device has used the specific set value.

9. The control device according to claim 1, wherein the controller sends a polling signal to a server to receive the second policy information from a memory of the server as a response to the polling signal, wherein the controller causes the second policy information to be stored in the memory of control device.

10. The control device according to claim 1, wherein the controller is further configured to:

in a case where an initialization instruction for initializing the image processing device is inputted to the image processing device, receive the second policy information from a server and initialize the specific set value according to the second policy information received from the server.

11. The control device according to claim 10, wherein the image processing device stores the first policy information, the controller is further configured to:

in the case where the initialization instruction is inputted to the image processing device, cause a display unit to display an inquiry screen for inquiring initialization according to the second policy information, the controller initializes the specific set value according to the second policy information in a case where the initialization according to the second policy information is instructed in the inquiry screen, and the controller initializes the specific set value according to the first policy information stored in the image processing device in a case where the initialization according to the second policy information is not instructed in the inquiry screen.

12. A non-transitory computer-readable recording medium storing computer-readable instructions for a control device, wherein the computer-readable instructions, when executed by a processor of the control device, cause the control device to:

obtain second policy information from a memory which stores first policy information and the second policy information, wherein the first policy information corresponds to a specific setting item, the specific setting item being of an image processing device and being settable by a user, and the second policy information corresponds to the specific setting item and is newer than the first policy information;

in a case where the second policy information is obtained from the memory, determine whether the image processing device has used a specific set value which is set for the specific setting item; and in a case where it is determined that the image processing device has not used the specific set value, change the specific set value from a current set value to a new set value which conforms to the second policy information, wherein in a case where it is determined that the image processing device has used the specific set value, the specific set value is maintained at the current set value.

13. A control method for a control device, the method comprising:

obtaining second policy information from a memory which stores first policy information and the second policy information, wherein the first policy information corresponds to a specific setting item, the specific setting item being of an image processing device and being settable by a user, and the second policy information corresponds to the specific setting item and is newer than the first policy information;

in a case where the second policy information is obtained from the memory, determining whether the image processing device has used a specific set value which is set for the specific setting item; and in a case where it is determined that the image processing device has not used the specific set value, changing the specific set value from a current set value to a new set value which conforms to the second policy information, wherein in a case where it is determined that the image processing device has used the specific set value, the specific set value is maintained at the current set value.

* * * * *